(12) United States Patent
Yamauchi et al.

(10) Patent No.: US 9,097,200 B2
(45) Date of Patent: Aug. 4, 2015

(54) STARTER AND STARTING METHOD OF COMPRESSION SELF-IGNITION ENGINE

(75) Inventors: Takeo Yamauchi, Aki-gun (JP); Yoshihisa Nakamoto, Hiroshima (JP); Hideki Hosoya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 209 days.

(21) Appl. No.: 13/807,262

(22) PCT Filed: Jun. 27, 2011

(86) PCT No.: PCT/JP2011/003649
§ 371 (c)(1),
(2), (4) Date: Dec. 27, 2012

(87) PCT Pub. No.: WO2012/001940
PCT Pub. Date: Jan. 5, 2012

(65) Prior Publication Data
US 2013/0096811 A1  Apr. 18, 2013

(30) Foreign Application Priority Data
Jun. 30, 2010  (JP) .................................. 2010-149958

(51) Int. Cl.
G06F 19/00  (2011.01)
F02N 11/08  (2006.01)
(Continued)

(52) U.S. Cl.
CPC ............ *F02D 41/30* (2013.01); *F02D 41/0005* (2013.01); *F02D 41/042* (2013.01);
(Continued)

(58) Field of Classification Search
CPC ... F02D 41/0005; F02D 41/042; F02D 41/06; F02D 41/30; F02D 17/00; F02N 11/0814; F02N 11/0851

USPC ................. 701/112; 123/179.1, 179.3, 179.4, 123/339.14, 339.18
See application file for complete search history.

(56) References Cited

U.S. PATENT DOCUMENTS 6,453,864 B1 *  9/2002  Downs et al. .............. 123/179.3
7,079,941 B2 *  7/2006  Tetsuno et al. ................ 701/112
(Continued)

FOREIGN PATENT DOCUMENTS

| | | |
|---|---|---|
| JP | 2005-282418 A | 10/2005 |
| JP | 2007-270775 A | 10/2007 |

(Continued)

OTHER PUBLICATIONS

International Search Report; PCT/JP2011/003649; Jul. 19, 2011.

*Primary Examiner* — Lindsay Low
*Assistant Examiner* — George Jin
(74) *Attorney, Agent, or Firm* — Studebaker & Brackett PC

(57) ABSTRACT

When a compression self-ignition engine is automatically stopped, at the same time as fuel cut for stopping fuel injection from a fuel injection valve (15) is executed, an operating position of an intake throttle (30) is set to fully closed, and the fully-closed state is maintained at least until final TDC. Furthermore, an operation of an accessory (32) performed after the fuel cut is controlled to adjust an engine load so that an engine rotation speed (Net) when passing the final TDC falls within a specific speed range (P) determined in advance. Accordingly, a piston (5) of a Compression-Stop Cylinder (2C) is stopped with high accuracy at a target position that is set on a bottom dead center-side of an intermediate position (CAx) between top dead center and bottom dead center, and a restart time of the engine is thereby reduced.

5 Claims, 7 Drawing Sheets

(51) Int. Cl.
*F02D 41/30* (2006.01)
*F02D 41/00* (2006.01)
*F02D 41/04* (2006.01)
*F02N 19/00* (2010.01)
*F02D 41/14* (2006.01)
*F02N 11/00* (2006.01)

(52) U.S. Cl.
CPC .......... *F02N11/0814* (2013.01); *F02N 19/005* (2013.01); *F02D 41/1497* (2013.01); *F02N 11/003* (2013.01); *F02N 2019/008* (2013.01); *Y02T 10/42* (2013.01); *Y02T 10/48* (2013.01)

(56) References Cited

U.S. PATENT DOCUMENTS

| | | | |
|---|---|---|---|
| 7,461,621 B2* | 12/2008 | Ota et al. | 123/179.4 |
| 7,706,961 B2* | 4/2010 | Tetsuno | 701/113 |
| 2005/0109302 A1* | 5/2005 | Tetsuno et al. | 123/179.5 |
| 2005/0193978 A1* | 9/2005 | Ishikawa | 123/399 |
| 2005/0221952 A1 | 10/2005 | Tetsuno et al. | |
| 2007/0199533 A1* | 8/2007 | Takahashi | 123/179.4 |
| 2010/0036590 A1* | 2/2010 | Nakai | 701/112 |
| 2010/0042311 A1* | 2/2010 | Nakai | 701/112 |
| 2010/0204908 A1* | 8/2010 | Nakai | 701/112 |

FOREIGN PATENT DOCUMENTS

| | | |
|---|---|---|
| JP | 2007-270809 A | 10/2007 |
| JP | 2009-062960 A | 3/2009 |
| JP | 2009-114942 A | 5/2009 |
| JP | 2009-235990 A | 10/2009 |
| JP | 2010-084658 A | 4/2010 |

\* cited by examiner

STARTER AND STARTING METHOD OF COMPRESSION SELF-IGNITION ENGINE

TECHNICAL FIELD

The present invention relates to a starter and a starting method of a compression self-ignition engine which burns fuel injected into a cylinder by self-ignition, wherein the starter and the starting method automatically stop the engine when a given automatic stop condition that is determined in advance for the engine is satisfied, and restart the engine when a given restart condition is subsequently satisfied by using a starter motor to apply a rotating force to the engine and executing fuel injection to a Compression-Stop Cylinder that is a cylinder in a compression stroke during engine stop.

BACKGROUND ART

Compression self-ignition engines as represented by a diesel engine generally have higher fuel efficiency and lower $CO_2$ emission than spark-ignition engines such as a gasoline engine. As a result, compression self-ignition engines are becoming widely prevalent as vehicular engines.

An effective way to further reduce $CO_2$ with such a compression self-ignition engine is to adopt so-called idle stop control in which the engine is automatically stopped during an idle operation or the like and subsequently automatically restarted when a starting operation of a vehicle or the like is performed. Various studies regarding idle stop control are underway.

For example, Patent Document 1 below discloses a diesel engine controller which automatically stops the diesel engine when a given automatic stop condition is satisfied and executes fuel injection while driving a starter motor to restart the diesel engine when a given restart condition is satisfied, wherein a cylinder to which fuel is injected first is variably set based on a piston stop position of a Compression-Stop Cylinder that is a cylinder in a compression stroke during stop (upon completion of engine stop).

Specifically, in Patent Document 1, when the diesel engine is automatically stopped, a piston position of the Compression-Stop Cylinder that is in a compression stroke at that point is determined, and a judgment is made on whether or not the piston position is at an appropriate position determined in advance (for example, a range from 120 to 100 CA degrees before compression top dead center). If the piston position is at an appropriate position, initial fuel is injected into the Compression-Stop Cylinder, and if the piston position is on the top dead center-side of the appropriate position, initial fuel is injected into an Intake-Stroke Cylinder that is a cylinder in an intake stroke during stop.

With such a configuration, when the piston of the Compression-Stop Cylinder is at the appropriate position, fuel can be injected into the Compression-Stop Cylinder to reliably self-ignite the fuel and, as a result, restart the engine in a relatively short period of time. On the other hand, when the piston of the Compression-Stop Cylinder is offset from the appropriate position to the side of the top dead center, due to an insufficient compression allowance of the piston and a failure of the air inside the cylinder to reach a sufficiently high temperature, there is a risk of misfire occurring even if fuel is injected into the Compression-Stop Cylinder. Therefore, in such a case, by injecting fuel into the Intake-Stop Cylinder instead of the Compression-Stop Cylinder, air inside the cylinder can be sufficiently compressed and the fuel can be self-ignited in a reliable manner.

CITATION LIST

Patent Literature

[PTL 1]
Japanese Patent Application Laid-Open No. 2009-62960

SUMMARY OF INVENTION

Technical Problem

However, the technique described in Patent Document 1 above is problematic in that although the engine can be restarted in a prompt manner when the piston of the Compression-Stop Cylinder is at the appropriate position, when the piston of the Compression-Stop Cylinder is offset to the side of the top dead center with respect to the appropriate position, fuel must be injected into the Intake-Stop Cylinder and self-ignition based on fuel injection cannot be performed until the piston of the Intake-Stop Cylinder reaches near the compression top dead center (in other words, until the second top dead center of the engine as a whole is reached), resulting in a longer restart time.

The present invention has been made in consideration of the circumstances described above, and an object thereof is to reliably self-ignite fuel injected into a Compression-Stop Cylinder for restart and to restart the engine in a shorter period of time by causing a piston of the Compression-Stop Cylinder to stop at a target position at a higher accuracy when automatically stopping a compression self-ignition engine.

Solution to Problem

In order to solve the problem described above, the present invention relates to a starter of a compression self-ignition engine which burns fuel injected into a cylinder by self-ignition, wherein the starter automatically stops the engine when a given automatic stop condition that is determined in advance for the engine is satisfied, and restarts the engine when a given restart condition is subsequently satisfied by using a starter motor to apply a rotating force to the engine and executing fuel injection to a Compression-Stop Cylinder that is a cylinder in a compression stroke during engine stop. The starter comprises a controller that controls various devices including an intake throttle that adjusts a flow rate of air passing through an intake passage of the engine, a fuel injection valve that injects fuel into respective cylinders of the engine, and an accessory that applies a load to the engine. The controller executes fuel cut in which fuel injection from the fuel injection valve is stopped, sets an operating position of the intake throttle to fully closed, and maintains the fully-closed state at least until final TDC that is the final top dead center immediately before stop of all cylinders, after the automatic stop condition is satisfied, and further stops a piston of the Compression-Stop Cylinder at a position that is on a bottom dead center-side of an intermediate position between top dead center and the bottom dead center by controlling an operation of the accessory performed after the fuel cut and adjusting an engine load so that an engine rotation speed when passing the final TDC falls within a specific speed range that is determined in advance.

Advantageous Effects of Invention

According to the present invention, when automatically stopping a compression self-ignition engine, a piston of a Compression-Stop Cylinder can be stopped at a target position at a higher accuracy. As a result, fuel injected into the Compression-Stop Cylinder for restart can be self-ignited in a reliable manner, and the engine can be restarted in a shorter period of time.

DESCRIPTION OF EMBODIMENTS (1) Overall Configuration of Engine

Figure 1:
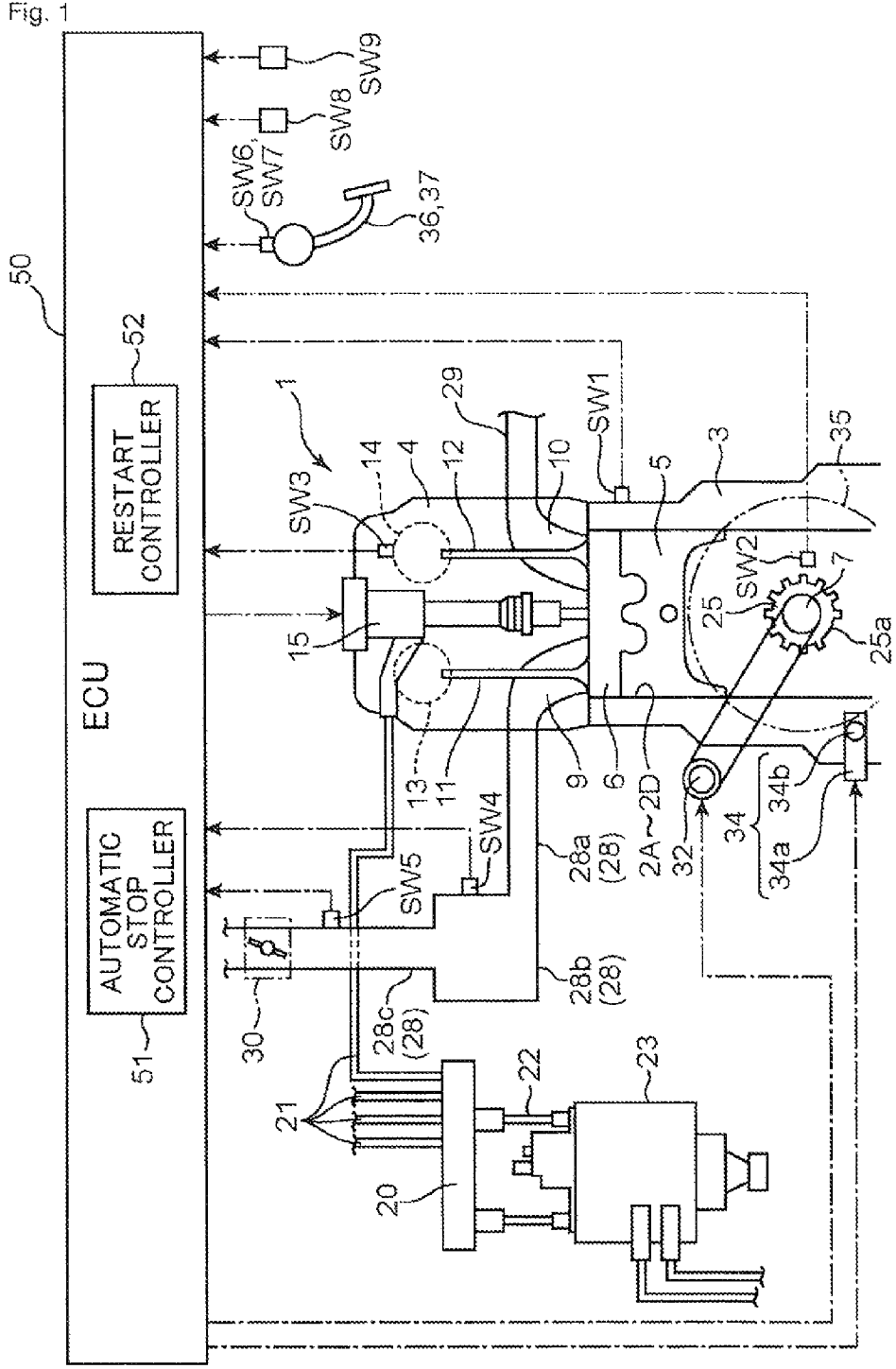
FIG. 1 is a diagram showing an overall configuration of a diesel engine to which a starter according to an embodiment of the present invention is applied.

FIG. 1 is a diagram showing an overall configuration of a diesel engine to which a starter according to an embodiment of the present invention is applied. The diesel engine shown in FIG. 1 is a 4-cycle diesel engine to be mounted to a vehicle as a travel drive power source. An engine main body 1 of the engine is a so-called in-line 4-cylinder type and comprises a cylinder block 3 having four cylinders 2A to 2D arranged in a row in a direction perpendicular to the plane of paper, a cylinder head 4 provided on an upper face of the cylinder block 3, and pistons 5 respectively inserted into the cylinders 2A to 2D so as to be reciprocatably slidable.

A combustion chamber 6 is formed above the piston 5. Fuel (diesel oil) injected from a fuel injection valve 15 (to be described later) is supplied to the combustion chamber 6. The injected fuel self-ignites (compression self-ignition) in the combustion chamber 6 of which temperature and pressure have been increased by a compressive action of the piston 5, whereby the piston 5 that is pushed downward by an expansive force caused by combustion moves reciprocatably in a vertical direction.

The piston 5 is coupled to a crankshaft 7 via a connecting rod (not shown) to cause the crankshaft 7 to rotate around a central axis in accordance with a reciprocating movement (vertical movement) of the piston 5.

With a 4-cycle 4-cylinder diesel engine such as that illustrated, pistons 5 provided in the respective cylinders 2A to 2D move vertically with a phase difference of 180 crank angle degrees (180 CA degrees). Therefore, timings of fuel injection and subsequent combustion of the cylinders 2A to 2D are respectively set at timings with phases offset by 180 CA degrees. Specifically, if the cylinders 2A, 2B, 2C, and 2D arranged in a row are respectively assigned cylinder numbers one, two, three and four, then combustion is performed in a sequence of number one cylinder 2A, number three cylinder 2C, number four cylinder 2D, and number two cylinder 2B. Therefore, for example, if number one cylinder 2A is in an expansion stroke, number three cylinder 2C, number four cylinder 2D, and number two cylinder 2B are respectively in a compression stroke, an intake stroke, and an exhaust stroke (refer to FIG. 2).

The cylinder head 4 is provided with an intake port 9 and an exhaust port 10 which open to the combustion chamber 6 of each of the cylinders 2A to 2D, and an intake valve 11 and an exhaust valve 12 which cover the respective ports 9 and 10 so as to be openable and closeable. Moreover, opening and closing of the intake valve 11 and the exhaust valve 12 are driven in conjunction with a rotation of the crankshaft 7 by valve operating mechanisms 13 and 14 which include a pair of camshafts arranged on the cylinder head 4.

In addition, a fuel injection valve 15 is provided for each of the cylinders 2A to 2D on the cylinder head 4. Each fuel injection valve 15 is connected to a common-rail 20 as an accumulator via a branch pipe 21. In the common-rail 20, fuel (diesel oil) supplied from a fuel feed pump 23 through a fuel-feeding pipe 22 is stored under high pressure, whereby fuel pressurized in the common-rail 20 is supplied to the respective fuel injection valves 15 via the branch pipes 21.

Each fuel injection valve 15 is constituted by an electromagnetic needle valve of which a tip portion is provided with an injection nozzle having a plurality of injection holes. A fuel path leading to the injection nozzle and a needle-like valving element which is actuated by electromagnetic force and which opens and closes the fuel path are included inside the electromagnetic needle valve (both not shown). As an electromagnetic force generated by energization drives the valving element in an opening direction, fuel supplied from the common-rail 20 is directly injected toward the combustion chamber 6 from each injection hole of the injection nozzle.

Cooling water circulates inside a water jacket (not shown) provided inside the cylinder block 3 and the cylinder head 4. A water temperature sensor SW1 for measuring the temperature of the cooling water inside the water jacket is provided in the cylinder block 3.

In addition, a crank angle sensor SW2 for measuring an angle of rotation and a rotational speed of the crankshaft 7 is provided in the cylinder block 3. The crank angle sensor SW2 outputs a pulse signal in accordance with a rotation of a crank plate 25 which integrally rotates with the crankshaft 7.

Specifically, a large number of teeth lined up at a certain pitch are provided so as to protrude from an outer peripheral portion of the crank plate 25. A toothless portion 25a (a portion without teeth) for identifying a reference position is formed in a given range of the outer peripheral portion of the crank plate 25. As the crank plate 25 having the toothless portion 25a at a reference position as described above rotates and a pulse signal based on the rotation is outputted from the crank angle sensor SW2, an angle of rotation (crank angle) and a rotational speed (engine rotation speed) of the crankshaft 7 can be determined.

Meanwhile, a cam angle sensor SW3 for determining an angle of a valve-operating camshaft (not shown) is provided on the cylinder head 4. The cam angle sensor SW3 outputs a pulse signal for cylinder discrimination in accordance with a pass of teeth of a signal plate which integrally rotates with the camshaft.

In other words, while a pulse signal outputted from the crank angle sensor SW2 includes a no-signal portion generated every 360 CA degrees in correspondence to the toothless portion 25a described above, a discrimination of a current stroke of each of the cylinders 2A to 2D among the intake, compression, expansion, and exhaust strokes cannot be performed solely based on this information. Accordingly, the cam angle sensor SW3 is configured to output a pulse signal based on a rotation of the camshaft that rotates once every 720

CA degrees, whereby cylinder discrimination is performed based on an output timing of this signal and a timing of the no-signal portion of the crank angle sensor SW2 (a timing of pass of the toothless portion 25a).

An intake passage 28 and an exhaust passage 29 are respectively connected to the intake port 9 and the exhaust port 10. In other words, intake air (fresh air) from the outside is supplied through the intake passage 28 to the combustion chamber 6, and exhaust gas (combustion gas) generated in the combustion chamber 6 is discharged to the outside through the exhaust passage 29.

A portion of the intake passage 28 that extends a predetermined distance upstream from the engine main body 1 constitutes branch passage sections 28a in which a branch is provided for each cylinder 2A to 2D. An upstream end of each of the branch passage sections 28a is connected to a surge tank 28b. A common passage section 28c constituted by a single passage is provided further upstream from the surge tanks 28b.

An intake throttle 30 for adjusting an amount of air (inlet flow) that flows into each cylinder 2A to 2D is provided at the common passage section 28c. The intake throttle 30 is configured to be basically maintained at a fully open position or almost fully open position during engine operation, and is closed to block the intake passage 28 only when required such as during engine stop.

An intake pressure sensor SW4 for measuring intake pressure is provided at the surge tank 28b. An air flow sensor SW5 for measuring inlet flow is provided at the common passage section 28c between the surge tank 28b and the intake throttle 30.

An alternator 32 is coupled to the crankshaft 7 via a timing belt or the like. The alternator 32 has a built-in regulator circuit that controls a current of a field coil (not shown) to adjust generated electricity, and is configured to receive a drive force of the crankshaft 7 to generate power based on a target value of generated electricity (target generation current) that is determined from an electrical load of the vehicle, a remaining capacity of a battery, or the like.

A starter motor 34 for starting the engine is provided in the cylinder block 3. The starter motor 34 comprises a motor main body 34a and a pinion gear 34b that is rotationally driven by the motor main body 34a.

The pinion gear 34b approachably and separatably meshes with a ring gear 35 coupled to one end of the crankshaft 7. When starting the engine using the starter motor 34, the pinion gear 34b moves to a predetermined meshing position and meshes with the ring gear 35, whereby a rotating force of the pinion gear 34b is transmitted to the ring gear 35 to rotationally drive the crankshaft 7.

(2) Control System

Respective parts of the engine configured as described above are comprehensively controlled by an ECU 50. The ECU 50 is a microprocessor constituted by a known CPU, ROM, RAM, and the like, and corresponds to the controller according to the present invention.

Various types of information from various sensors are inputted to the ECU 50. In other words, the ECU 50 is electrically connected to the water temperature sensor SW1, the crank angle sensor SW2, the cam angle sensor SW3, the intake pressure sensor SW4, and the air flow sensor SW5 provided at various parts of the engine, and based on input signals from the respective sensors SW1 to SW5, acquires various types of information such as an engine cooling water temperature, a crank angle, an engine rotation speed, cylinder discrimination, an intake pressure, and an inlet flow.

In addition, information from various sensors (SW6 to SW9) provided on the vehicle is also inputted to the ECU 50. Specifically, the vehicle is provided with an accelerator operating position sensor SW6 for measuring an operating position of an accelerator pedal 36 which an operator stamps on to operate, a brake sensor SW7 for detecting ON/OFF (actuation or non-actuation) of a brake pedal 37, a vehicle speed sensor SW8 for measuring a travel speed of the vehicle (vehicle speed), and a battery sensor SW9 for measuring a remaining capacity of a battery (not shown). Based on input signals from the respective sensors SW6 to SW9, the ECU 50 obtains information such as an accelerator operating position, actuation or non-actuation of the brake, vehicle speed, and remaining capacity of the battery.

The ECU 50 executes various computations based on input signals from the respective sensors SW1 to SW9 to control the respective parts of the engine. Specifically, the ECU 50 is electrically connected to the fuel injection valve 15, the intake throttle 30, the alternator 32, and the starter motor 34, and based on results of the computations and the like, respectively outputs a drive control signal to the devices.

Further specific functions of the ECU 50 will now be described. For example, during a normal operation of the engine, the ECU 50 executes control to cause the fuel injection valve 15 to inject a fuel requirement determined based on operating conditions and to cause the alternator 32 to generate a power requirement determined based on an electrical load of the vehicle, a remaining capacity of a battery, or the like. Furthermore, besides such basic control, the ECU 50 executes so-called idle stop control in which the engine is automatically stopped and an automatically-stopped engine is restarted under respective given conditions set in advance. In other words, the ECU 50 functionally includes an automatic stop controller 51 responsible for control related to automatically stopping the engine and a restart controller 52 responsible for restarting the engine.

The automatic stop controller 51 judges whether or not an engine automatic stop condition determined in advance is satisfied during an operation of the engine, and if satisfied, executes control for automatically stopping the engine.

For example, the automatic stop condition is judged as being satisfied when a plurality of conditions including the vehicle being in a stop state (the vehicle speed is 0 km/h) is met and a confirmation is made that the engine may be stopped with no problem. Subsequently, the engine is stopped by stopping fuel injection from the fuel injection valve 15 or the like.

The restart controller 52 judges whether or not a restart condition determined in advance is satisfied after the engine is automatically stopped, and if satisfied, executes control for restarting the engine.

For example, the restart condition is judged as being satisfied whenever it is necessary to start the engine such as when the operator stamps on the accelerator pedal 36 to move the vehicle. Subsequently, the engine is restarted by driving the starter motor 34 to apply a rotating force to the crankshaft 7 and restarting fuel injection from the fuel injection valve 15.

(3) Automatic Stop Control

Figure 2:
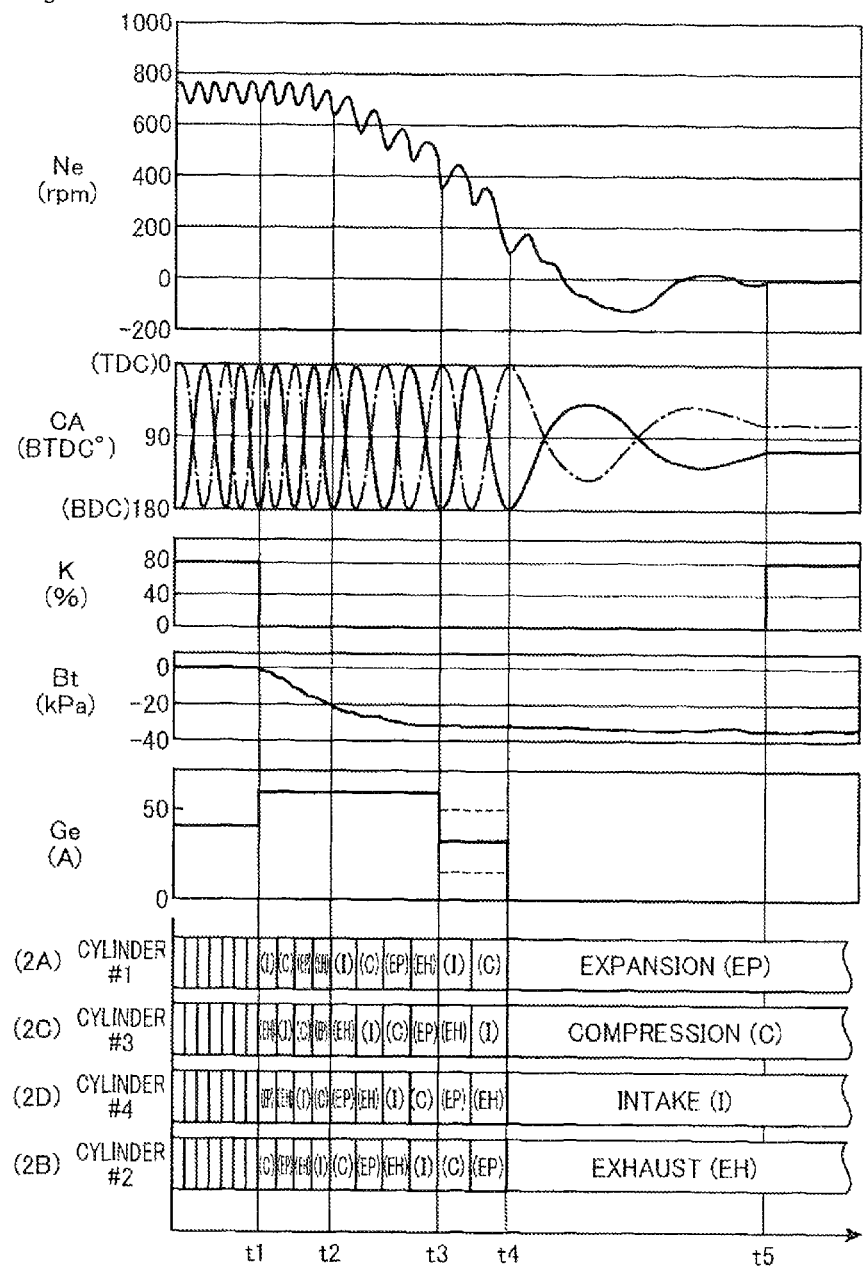
FIG. 2 is a time chart showing variations in respective state quantities during automatic stop control of the engine.

Next, contents of automatic stop control of the engine which is executed by the automatic stop controller 51 of the ECU 50 will be described in detail. FIG. 2 is a time chart showing variations in respective state quantities during automatic stop control of the engine. In FIG. 2, a point where the automatic stop condition of the engine is satisfied is denoted by t1.

As shown in FIG. 2, when controlling automatic stop of the engine, an operating position K of the intake throttle 30 is set to fully closed (0%) upon the point t1 at which the automatic stop condition is satisfied. While keeping the operating position K fully closed, control for stopping fuel injection from the fuel injection valve 15 (fuel cut) is executed (point t2). Furthermore, as an engine rotation speed Ne gradually declines after the execution of the fuel cut, control is executed for reducing a target generation current Ge of the alternator 32 in accordance with a rate of decline of the engine rotation speed Ne (points t3 to t4).

Figure 3:
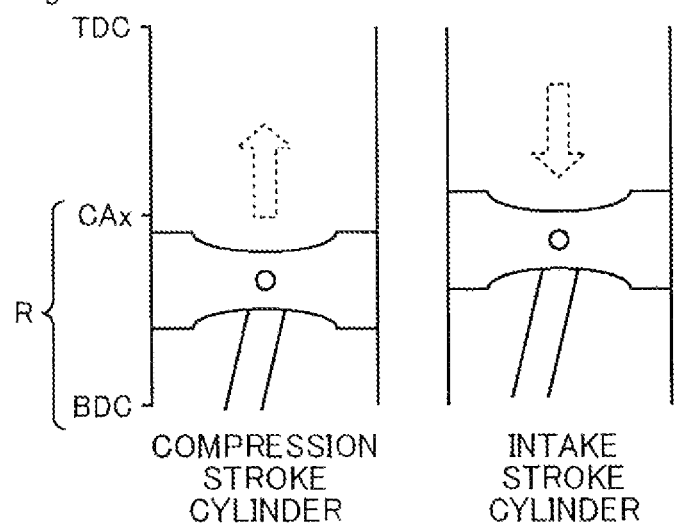
FIG. 3 is a diagram showing a target range of a piston stop position of a Compression-Stop Cylinder.

As shown in FIG. 3, such control is executed in order to ensure that a stop position of a piston of a Compression-Stop Cylinder which is a cylinder in a compression stroke upon complete stop of the engine (the cylinder 2C in FIG. 2) is within a range on a bottom dead center-side of an intermediate position CAx between top dead center and the bottom dead center (a range denoted by R in FIG. 3). When a piston 5 of the Compression-Stop Cylinder 2C is stopped in such a range R near the bottom dead center, the engine can be restarted in a prompt and reliable manner by injecting initial fuel (initial fuel as the entire engine) into the Compression-Stop Cylinder 2C upon engine restart.

Figure 4:
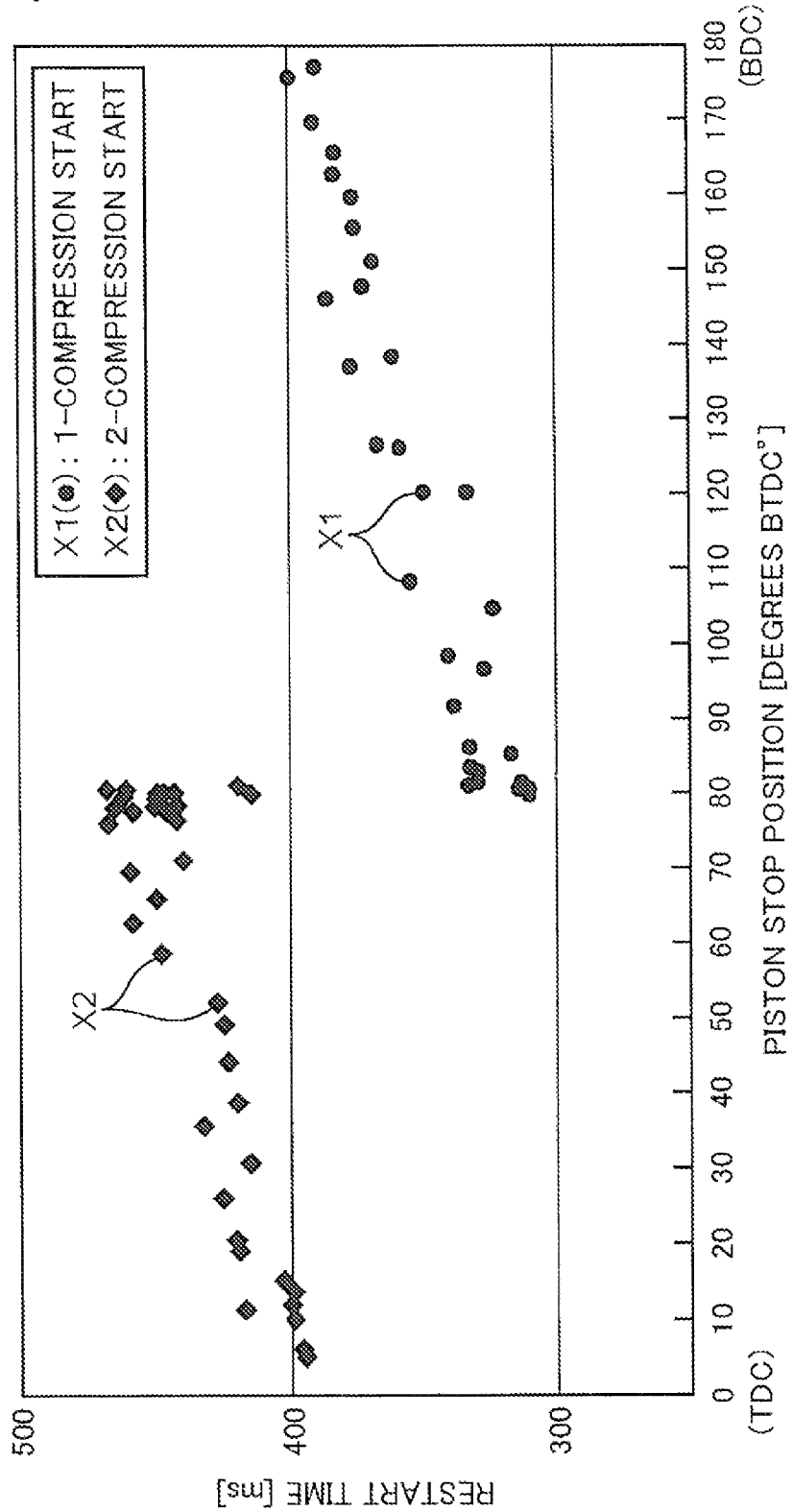
FIG. 4 is a graph showing a relationship between a piston stop position of a Compression-Stop Cylinder and engine restart time.

This feature will be described in detail with reference to FIG. 4. FIG. 4 is a graph showing a relationship between a piston stop position (horizontal axis) of the Compression-Stop Cylinder 2C and engine restart time (vertical axis). Note that a restart time as used herein refers to a period of time from a point where the starter motor 34 is started to a point where engine rotation speed reaches 750 rpm. In addition, in FIG. 4, a plot X1 denoted by black dots represents a case where the engine is restarted by injecting initial fuel into the Compression-Stop Cylinder 2C, and a plot X2 denoted by black diamonds represents a case where the engine is restarted by injecting initial fuel into an Intake-Stop Cylinder (in other words, a cylinder that is in an intake stroke upon completion of stop of the engine; the cylinder 2D in FIG. 2). Data of the plots was obtained under a condition in which an engine cooling water temperature is 75 degrees Celsius, outside temperature is 25 degrees Celsius, and altitude is 0 m (standard atmospheric pressure).

As shown in the graph in FIG. 4, when the piston 5 of the Compression-Stop Cylinder 2C is further toward the bottom dead center with respect to a position approximately 80 degrees in crank angle before the top dead center (near 80 CA degrees BTDC), the engine can be restarted by injecting initial fuel into the Compression-Stop Cylinder 2C (plot X1). In other words, when the piston stop position of the Compression-Stop Cylinder 2C is within the range described above, a relatively large amount of air exists in the cylinder 2C. Therefore, as the piston 5 rises during engine restart, the air inside the cylinder 2C is sufficiently compressed and reaches a high temperature. Therefore, even if initial fuel is injected into the Compression-Stop Cylinder 2C during restart, the fuel reliably self-ignites and burns inside the cylinder 2C.

As described, when the piston stop position of the Compression-Stop Cylinder 2C is further toward the bottom dead center than near 80 CA degrees BTDC, the engine can be restarted by injecting fuel into the Compression-Stop Cylinder 2C. In this case, since fuel injection can be started when the engine as a whole reaches the first top dead center, engine restart only requires a very short period of time (approximately 300 to 400 msec). Hereinafter, restarting the engine by injecting fuel into the Compression-Stop Cylinder 2C as described above may also be referred to as a one-compression start.

On the other hand, when the piston stop position of the Compression-Stop Cylinder 2C is on the top dead center-side with respect to near 80 CA degrees BTDC, fuel injected into the Compression-Stop Cylinder 2C cannot be self-ignited. Therefore, it is necessary to inject initial fuel into the Intake-Stop Cylinder 2D (plot X2). In other words, when the piston stop position of the Compression-Stop Cylinder 2C is within the range described above, only a relatively small amount of air exists in the cylinder 2C. Therefore, even when the piston 5 rises during engine restart, the air inside the cylinder 2C is not sufficiently compressed and cannot be expected to reach a high temperature. Consequently, a need arises to restart the engine by injecting initial fuel into the Intake-Stop Cylinder 2D which enters a compression stroke next instead of the Compression-Stop Cylinder 2C.

As shown in FIG. 3, the Compression-Stop Cylinder 2C and the Intake-Stop Cylinder 2D are 180 CA degrees out of phase with each other. Therefore, after the piston 5 of the Compression-Stop Cylinder 2C passes the top dead center, the piston 5 of the Intake-Stop Cylinder 2D next reaches compression top dead center. In consideration thereof, initial fuel is injected into the Intake-Stop Cylinder 2D after the piston 5 of the cylinder 2D rises to near the compression top dead center (in other words, after the second top dead center is reached by the engine as a whole). Accordingly, even though a period of time required for engine restart increases (approximately 400 to 500 msec), the engine can be reliably restarted. Hereinafter, restarting the engine by injecting fuel into the Intake-Stop Cylinder 2D as described above may also be referred to as a two-compression start.

As should be apparent from the description above, upon engine restart, one-compression start in which fuel is injected into the Compression-Stop Cylinder 2C and two-compression start in which fuel is injected into the Intake-Stop Cylinder 2D may be selectively used depending on whether the piston stop position of the Compression-Stop Cylinder 2C is on the side of the bottom dead center or the side of the top dead center with respect to near 80 CA degrees BTDC (depending on whichever side of 80 CA degrees BTDC). Accordingly, the engine can be reliably restarted regardless of the piston position upon engine stop.

However, as should be apparent from the graph shown in FIG. 4, restarting the engine by one-compression start requires a significantly shorter amount of time for restart than two-compression start because there is no need to wait until the first top dead center (the top dead center of the Compression-Stop Cylinder 2C) passes.

Therefore, from the perspective of reducing restart time, the engine is desirably restarted by one-compression start and, in order to do so, the piston 5 of the Compression-Stop Cylinder 2C must be stopped at least on the bottom dead center-side of near 80 CA degrees BTDC.

A target range R of a piston stop position shown in FIG. 3 is set as a range where the one-compression start as described above can be performed. Therefore, an intermediate position CAx that is an upper limit of the target range R is set to 90 CA degrees BTDC as a value that is slightly on the bottom dead center-side of 80 CA degrees BTDC. By stopping the piston 5 of the Compression-Stop Cylinder 2C in such a target range R (on the bottom dead center-side of 90 CA degrees), one-compression start can be performed and engine restart time can be further reduced.

Meanwhile, even when attempting to keep the piston stop position in the target range R described above, if a large amount of air exists on average in each cylinder 2A to 2D, a tendency arises that piston stop positions are more likely to concentrate at an intermediate position (near the intermediate position CAx in FIG. 3) between the top dead center and the bottom dead center as a position where an equilibrium is established between a compression reaction force and an expansion reaction force which act on the piston 5.

Figure 5:
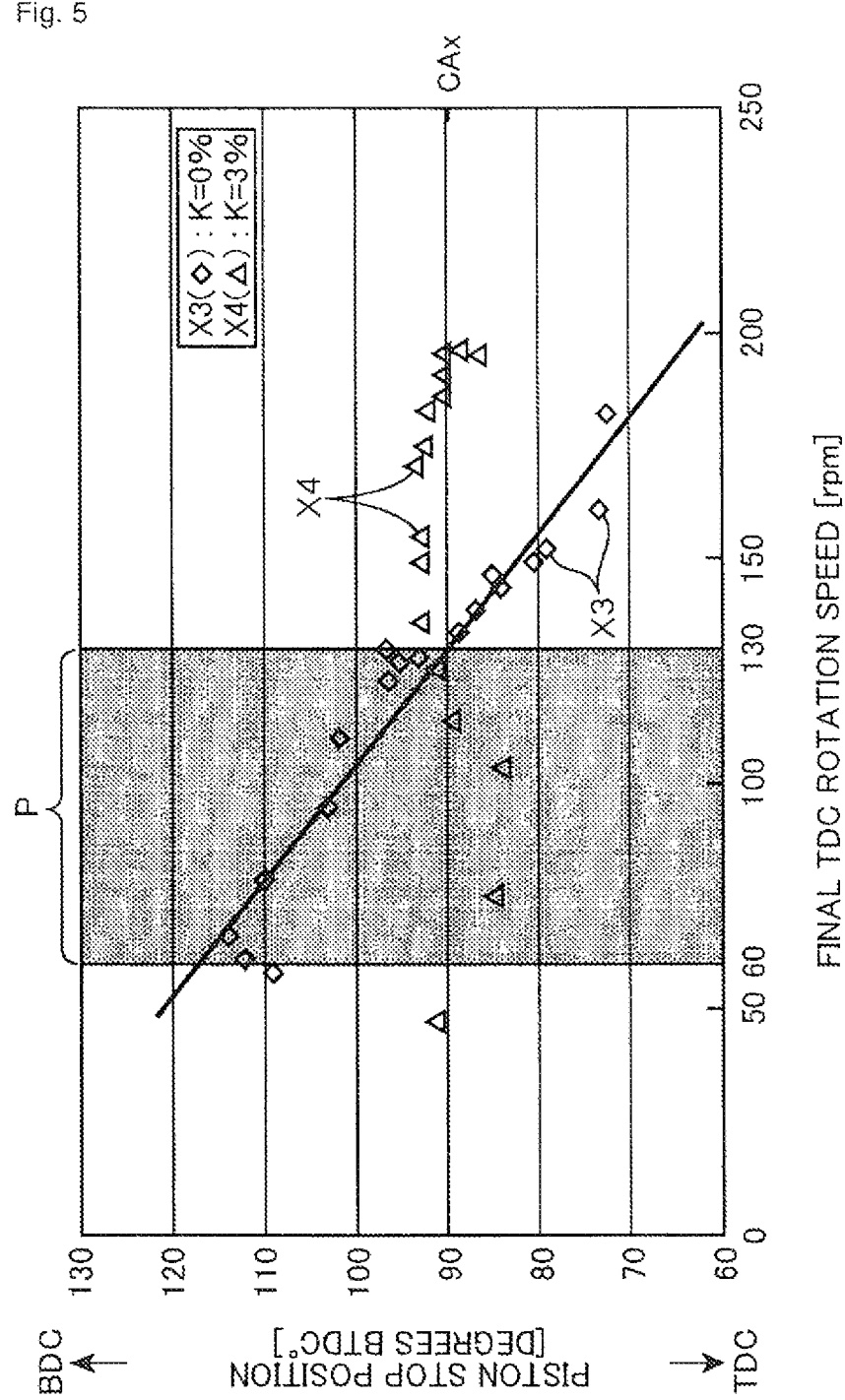
FIG. 5 is a graph showing a relationship between engine rotation speed when passing final TDC and a piston stop position of a Compression-Stop Cylinder.

FIG. 5 shows a graph which compares piston stop positions of the Compression-Stop Cylinder 2C between a case where an operating position K of the intake throttle 30 is set to 3% and a case where the operating position K of the intake throttle 30 is set to 0% during a process of automatically stopping the engine. Specifically, in the graph, a plot X3 (a plot of outlined diamonds) representing an operating position K of 0% indicates a piston stop position in a case of automatic stop control such as shown in FIG. 2 or, in other words, executing fuel cut after the intake throttle 30 is fully closed (K=0%) and maintaining the fully-closed state until the engine completely stops. In addition, a plot X4 (a plot of outlined triangles) representing an operating position K of 3% indicates a piston stop position in a case where similar control is performed in a state where the intake throttle 30 is opened to K=3%. Moreover, since the engine rotation speed Ne during automatic stop of the engine is extremely low, an operating position K of 3% of the intake throttle 30 is equivalent to an approximately fully open state of the intake throttle 30 (in other words, almost a same amount of fresh air as when fully opened flows in when the intake throttle 30 is opened to an operating position K of 3%). In addition, in the graph shown in FIG. 5, a horizontal axis (final TDC rotation speed Net) represents an engine rotation speed upon passing of the final top dead center with respect to all cylinders immediately before stop or, in other words, when a cylinder which reaches top dead center last among the cylinders 2A to 2D reaches the top dead center (in a 4-cycle 4-cylinder engine such as that described in the present embodiment, the point t4 at which the Intake-Stop Cylinder 2D or an Expansion-Stop Cylinder 2A (a cylinder that is in an expansion stroke during stop) reaches the top dead center). Furthermore, a vertical axis of the graph shown in FIG. 5 represents a piston stop position of the Compression-Stop Cylinder 2C. Hereinafter, "the final top dead center with respect to all cylinders immediately before stop" as described above will be referred to as final TDC.

The engine rotation speed Net upon passing the final TDC described above must be within a certain range to constitute final TDC (final top dead center). In the example shown in FIG. 5, a range satisfying final TDC is approximately 50 to 200 rpm.

The plot X4 in the graph shown in FIG. 5 reveals that when the operating position K of the intake throttle 30 is 3%, piston stop positions of the Compression-Stop Cylinder 2C are roughly concentrated around 90 CA degrees BTDC regardless of the value of the engine rotation speed Net upon passing the final TDC. This is conceivably due to the fact that when the engine is stopped in a state where the operating position K=3%, a certain amount of air is supplied from the intake passage 28, whereby an increase in the average amount of air in the respective cylinders results in an increased influence of a compression reaction force (a reaction force generated by a positive pressure of compressed air) which acts on the piston 5 of the compression stroke cylinder and an expansion reaction force (a reaction force generated by a negative pressure of expanded air) which acts on the piston 5 of the expansion stroke cylinder. When the influence of such a reaction force due to compression or expansion is significant, a final stop position of the piston 5 is likely to be an intermediate position between the top dead center and the bottom dead center (in other words, near 90 CA degrees that is a position where an equilibrium is established between the compression reaction force and the expansion reaction force) regardless of the rotational speed Net upon passing the final TDC.

On the other hand, when the operating position K of the intake throttle 30 is 0%, as indicated by the plot X3, a definite correlation is established between the rotational speed Net upon passing the final TDC and piston stop positions of the Compression-Stop Cylinder 2C. More specifically, the greater the rotational speed Net when passing the final TDC, the closer the piston stop position of the Compression-Stop Cylinder 2C to the top dead center, and the smaller the rotational speed Net when passing the final TDC, the closer the piston stop position of the Compression-Stop Cylinder 2C to the bottom dead center. This is conceivably due to the fact that when stopping the engine in a state where the operating position K=0%, a reciprocating movement of the piston 5 in a state where air distribution in the intake passage 28 is blocked causes an average amount of air in each cylinder to gradually decrease and, as a result, reduces an influence of reaction forces (a compression reaction force and an expansion reaction force) acting on the piston 5 due to compression and expansion of air. When the influence of a compression reaction force or an expansion reaction force diminishes in this manner, an influence of a frictional force acting on the piston 5 (a reaction force due to a sliding friction between the piston 5 and a cylinder wall) becomes dominant. Therefore, since a final piston stop position is dependent on a magnitude of the rotational speed Net when passing the final TDC (in other words, a difference in momentum of the piston 5 when passing the final top dead center), a definite correlation is established between the rotational speed Net upon passing the final TDC and the piston stop position. In the example shown in FIG. 5, a piston stop position of the Compression-Stop Cylinder 2C roughly varies between 70 to 115 CA degrees BTDC depending on the rotational speed Net when passing the final TDC.

As described above, in order to enable the one-compression start in which the engine is restarted by injecting initial fuel into the Compression-Stop Cylinder 2C, the piston stop position of the cylinder 2C must be set within a range R that is on the bottom dead center-side of the intermediate position CAx shown in FIG. 3 (in the present embodiment, 90 CA degrees BTDC). According to FIG. 5, the piston stop position falls within the range R when the operating position K of the intake throttle 30 is set to 0% (fully closed) and the engine rotation speed Net when passing the final TDC is within 60 to 130 rpm (a range P shown in FIG. 5). In other words, by setting the operating position K to 0%, the piston 5 of the Compression-Stop Cylinder 2C can be stopped on the bottom dead center-side of 90 CA degrees BTDC by keeping the engine rotation speed Net when passing the final TDC within the range P (hereinafter referred to as a specific speed range P). As a result, upon subsequent restart, the engine can be started in a prompt manner by one-compression start.

On the other hand, when the operating position K of the intake throttle 30 is 3%, since piston stop positions of the Compression-Stop Cylinder 2C concentrate near 90 CA degrees BTDC, it is difficult to reliably stop the piston 5 on the bottom dead center-side of 90 CA degrees.

In consideration of the above, in the present embodiment, the operating position K of the intake throttle 30 is set to 0% (fully closed) at the point t1 in FIG. 2 (when the automatic stop condition is satisfied), whereby the fully-closed state is maintained until a point t5 at which the engine comes to a complete stop. Accordingly, as indicated by the plot X3 in FIG. 5, since the piston stop positions of the Compression-Stop Cylinder 2C are to have a certain width on either side of 90 CA degrees BTDC, a case can be created where the piston 5 stops on the bottom dead center-side of 90 CA degrees BTDC.

However, the piston stop position comes to the bottom dead center-side of 90 CA degrees BTDC when engine rotation speed Net upon passing the final TDC is within the specific speed range P (60 to 130 rpm) described above. In other words, in order to reliably stop the piston on the bottom dead center-side of 90 CA degrees, the engine rotation speed Net upon passing the final TDC must be kept within the specific speed range P. As control performed to this end, in the present embodiment, a load applied to the engine (crankshaft 7) is adjusted by varying a target generation current Ge of the alternator 32 in accordance with a rate of decline of the engine rotation speed Ne at the point t3 in FIG. 2 so that the engine rotation speed Net upon passing the final TDC (the point t4) falls within the specific speed range P.

The specific speed range P is set in correspondence to a distribution of the plot X3 in FIG. 5 to a range on a low rotation-side of an intermediate value (130 rpm) of a speed range between an upper limit (approximately 200 rpm) and a lower limit (approximately 50 rpm) of the engine rotation speed Net upon passing the final TDC. In this manner, by setting a range that is relatively lower speed among a rotational speed range which may potentially become the final TDC as the specific speed range P, a piston speed when passing the final TDC can be relatively reduced and the piston 5 of the Compression-Stop Cylinder 2C can be reliably stopped within the target range R (on the bottom dead center-side of the intermediate position CAx between the top dead center and the bottom dead center) described above.

Moreover, in the example shown in FIG. 2, as control for adjusting the target generation current Ge, Ge is initially increased (at the point t1) and then reduced at the subsequent point t3 by a required amount from the increased value. The target generation current Ge of the alternator 32 is controlled by such a method because responsiveness of Ge to control is better when Ge is being reduced than when Ge is being increased and enables load applied to the engine to be adjusted instantaneously.

Figure 6:
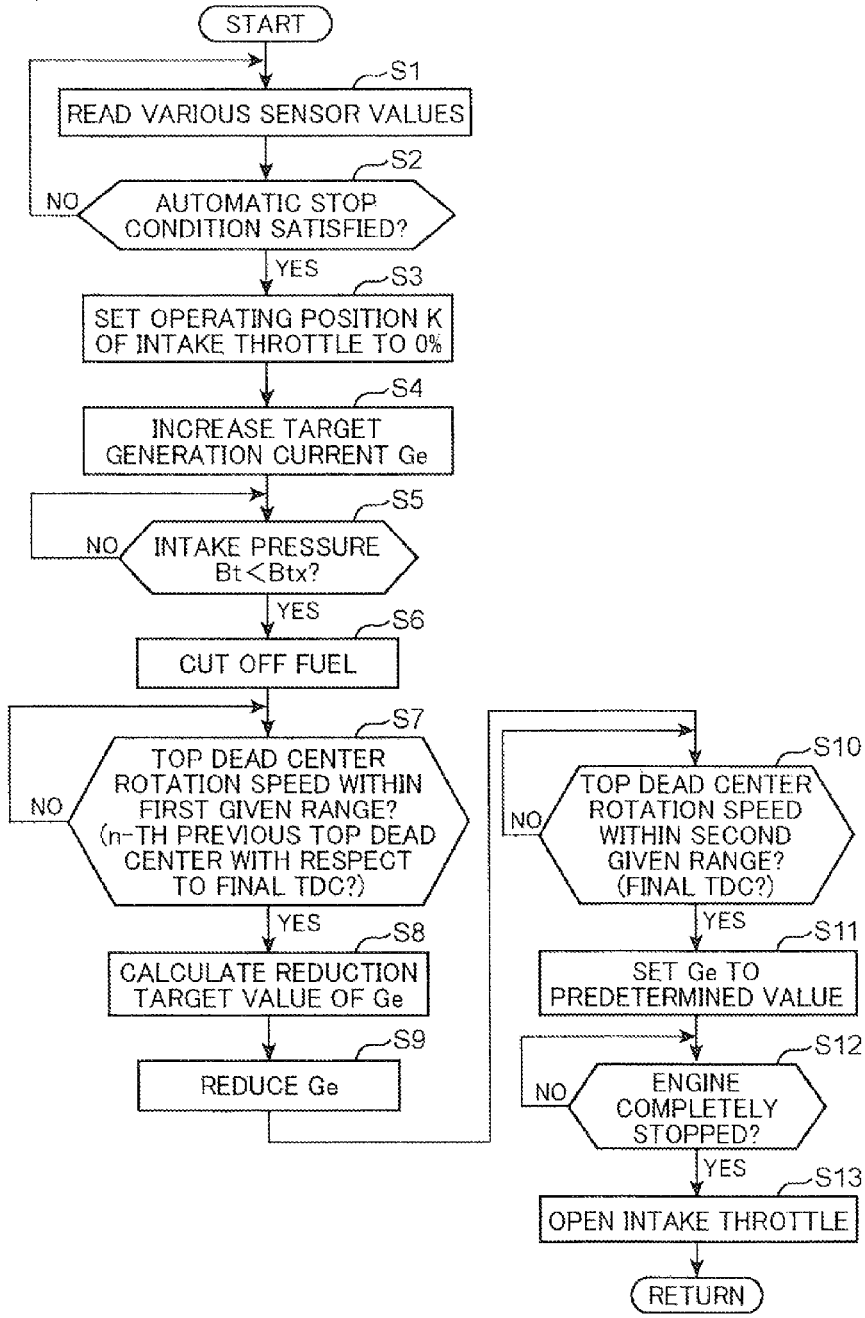
FIG. 6 is a flow chart showing specific contents of a control operation executed upon automatic stop of an engine.

Next, a control operation of the automatic stop controller 51 of the ECU 50 that is responsible for control during automatic stop of the engine as described above will be described with reference to a flow chart shown in FIG. 6. Upon start of processing depicted in the flow chart shown in FIG. 6, the automatic stop controller 51 executes control for reading various sensor values (step S1). Specifically, respective measurement signals are read from the water temperature sensor SW1, the crank angle sensor SW2, the cam angle sensor SW3, the intake pressure sensor SW4, the air flow sensor SW5, the accelerator operating position sensor SW6, the brake sensor SW7, the vehicle speed sensor SW8, and the battery sensor SW9, and based on the signals, various information is acquired including an engine cooling water temperature, a rotational speed, a crank angle, cylinder discrimination information, intake pressure, an inlet flow, an accelerator operating position, actuation or non-actuation of the brake, vehicle speed, and battery remaining capacity.

Next, based on information acquired in step S1, the automatic stop controller 51 judges whether or not the automatic stop condition of the engine has been satisfied (step S2). For example, the automatic stop condition is judged as being satisfied when all of a plurality of conditions is achieved such as conditions requiring that the vehicle is stationary (vehicle speed=0 km/h), the operating position of the accelerator pedal 36 is at zero (accelerator OFF), the brake pedal 37 is being operated (brake ON), the engine cooling water temperature is equal to or higher than a predetermined value (warm state), and the battery remaining capacity is equal to or higher than a predetermined value. Moreover, as far as vehicle speed is concerned, a complete stop (vehicle speed=0 km/h) need not necessarily be set as a condition. Alternatively, a condition may be set which requires that the vehicle speed is equal to or lower than a predetermined low vehicle speed (for example, equal to or lower than 5 km/h).

When a judgment of YES is made in step S2 and the automatic stop condition is confirmed as being satisfied, the automatic stop controller 51 sets the operating position K of the intake throttle 30 to fully closed (0%) (step S3) and executes control for increasing the target generation current Ge of the alternator 32 (step S4).

Specifically, as depicted in the time chart shown in FIG. 2, at the point t1 where the automatic stop condition is satisfied, the operating position K of the intake throttle 30 is reduced from a predetermined high position set during normal operation (in the illustrated example, 80%) to fully closed (0%). At the same time, the target generation current Ge of the alternator 32 is increased from a set value up to the point t1 to a given value determined in advance. For example, assuming that the target generation current Ge during idling is set to a range of 0 to 50 A depending on a condition such as a battery remaining capacity or an electrical load on the vehicle, the target generation current Ge is increased to 60 A that is a higher value.

Subsequently, the automatic stop controller 51 judges whether or not an intake pressure (boost pressure) Bt based on the intake pressure sensor SW4 has fallen below a threshold Btx determined in advance (step S5). In other words, since the air inside the intake passage 28 is sent to the discharging side and the pressure inside the intake passage 28 becomes negative after the piston 5 performs several reciprocating movements with the intake throttle 30 fully closed, the judgment of step S5 is made to verify an effect of pressure reduction. In this case, the threshold Btx is set to −20 kPa.

When a judgment of YES is made in step S5 and the intake pressure Bt is verified as being lower than the threshold Btx, the automatic stop controller 51 executes control to stop supply of fuel from the fuel injection valve 15 by constantly maintaining a closed state of the fuel injection valve 15 (step S6). In the time chart shown in FIG. 2, fuel supply is stopped (fuel cut) at the point t2 where the intake pressure Bt has fallen below −20 kPa (threshold Btx).

Next, the automatic stop controller 51 judges whether or not a value of an engine rotation speed Ne when the piston 5 of any of the cylinders 2A to 2D reaches top dead center (top dead center rotation speed) is within a first given range that has been determined in advance (step S7). Moreover, as shown in FIG. 2, since the engine rotation speed Ne gradually decreases while repetitively falling whenever any of the cylinders 2A to 2D reaches compression top dead center and rising once again after the cylinder moves past the compression top dead center, the top dead center rotation speed can be measured as the rotation speed Ne corresponding to a timing of a valley among the ups and downs.

The judgment in step S7 in regards to the top dead center rotation speed is made in order to identify a pass timing (the point t3 in FIG. 2) of the n-th previous top dead center with respect to the final top dead center immediately prior to engine stop (final TDC). In other words, during the process of automatically stopping the engine, there is a certain regularity in how the rotational speed Ne of the engine decreases. Therefore, by studying the rotational speed Ne upon passing top dead center (top dead center rotation speed), it is possible to estimate a reverse chronological order of the top dead center with respect to the final TDC. Accordingly, by measuring the top dead center rotation speed as needed and judging whether or not the top dead center rotation speed falls within a first given range determined in advance (a range examined in advance by experiment or the like as corresponding to a rotational speed of the n-th previous top dead center with respect to the final TDC), a timing of pass of the n-th previous (second previous in FIG. 2) top dead center with respect to the final TDC is identified.

When a judgment of YES is made in step S7 and the present point in time is verified as being a timing of pass of the n-th previous top dead center with respect to the final TDC, based on an engine rotation speed Ne at that point (the point t3 in FIG. 2), the automatic stop controller 51 calculates a reduction target value indicating as to what degree the target generation current Ge of the alternator 32 is to be reduced from a former value (a value subsequent to the point t1) (step S8), and executes control for reducing the target generation current Ge in accordance with the calculated reduction target value (step S9).

The amount of reduction of the target generation current Ge in step S9 is set smaller when a top dead center rotation speed that is judged as being within the given range in step S7 is closer to an upper limit of the given range and set larger when the top dead center rotation speed is closer to a lower limit of the given range. In other words, the greater the rotational speed at the n-th (the point t3) previous top dead center with respect to the final TDC, the greater the value of the target generation current Ge of the alternator 32 (the greater the engine load), and the smaller the top dead center rotation speed at the point t3, the smaller the value of the target generation current Ge (the smaller the engine load).

By performing such control, variation in the rotational speed Net when the engine reaches the final TDC (the point t4) becomes relatively low and is to fall within the specific speed range P shown in FIG. 5 at a considerably high probability.

Next, the automatic stop controller 51 judges whether or not a value of an engine rotation speed Ne when any of the cylinders 2A to 2D reaches top dead center (top dead center rotation speed) is within a second given range that has been determined in advance (step S10). The second given range used for this judgment is for identifying that the final TDC has been passed and is set to a value smaller than the first given range in step S7. In a similar manner as described earlier for step S7, what kind of rotational speed range enables a determination of final TDC is to be examined in advance by experiment or the like.

When a judgment of YES is made in S10 and the present point in time is verified as being a timing of pass of the final TDC, the automatic stop controller 51 executes control at this point (the point t4 in FIG. 2) for setting the target generation current Ge of the alternator 32 to a given value determined in advance (for example, 0 A) (step S11).

After being subjected to such control, the engine reaches a complete stop state (the point t5 in FIG. 2) without subsequently ever passing top dead center (although temporarily actuated in a direction of reverse rotation). In most cases, the piston position of the Compression-Stop Cylinder 2C at this point is conceivably within the target range R shown in FIG. 3 or, in other words, on the bottom dead center-side of the intermediate position CAx (in this case, 90 CA degrees) between top dead center and bottom dead center. In other words, as described above, during the process of stopping the engine, since the intake throttle 30 is fully closed (0%) and fuel cut is executed (S3, S6) and, the target generation current Ge of the alternator 32 is adjusted before the engine reaches the final TDC (S9), there is a high probability that the engine rotation speed Net upon passing the final TDC falls within the specific speed range P shown in FIG. 5. If this is the case, according to the relationship shown in FIG. 5, the piston position of the Compression-Stop Cylinder 2C upon complete stop of the engine is on the bottom dead center-side of 90 CA degrees (=CAx).

Subsequently, the automatic stop controller 51 judges whether or not the engine rotation speed Ne=0 rpm in order to judge whether or not the engine is completely stopped (step S12). If the engine is completely stopped, control is executed for setting the operating position K of the intake throttle 30 to an operating position set during normal operation (for example, 80%) (step S13).

(4) Restart Control

Next, contents of control executed by the restart controller 52 of the ECU 50 after automatic stop of the engine will be described with reference to the flow chart shown in FIG. 7.

Figure 7:
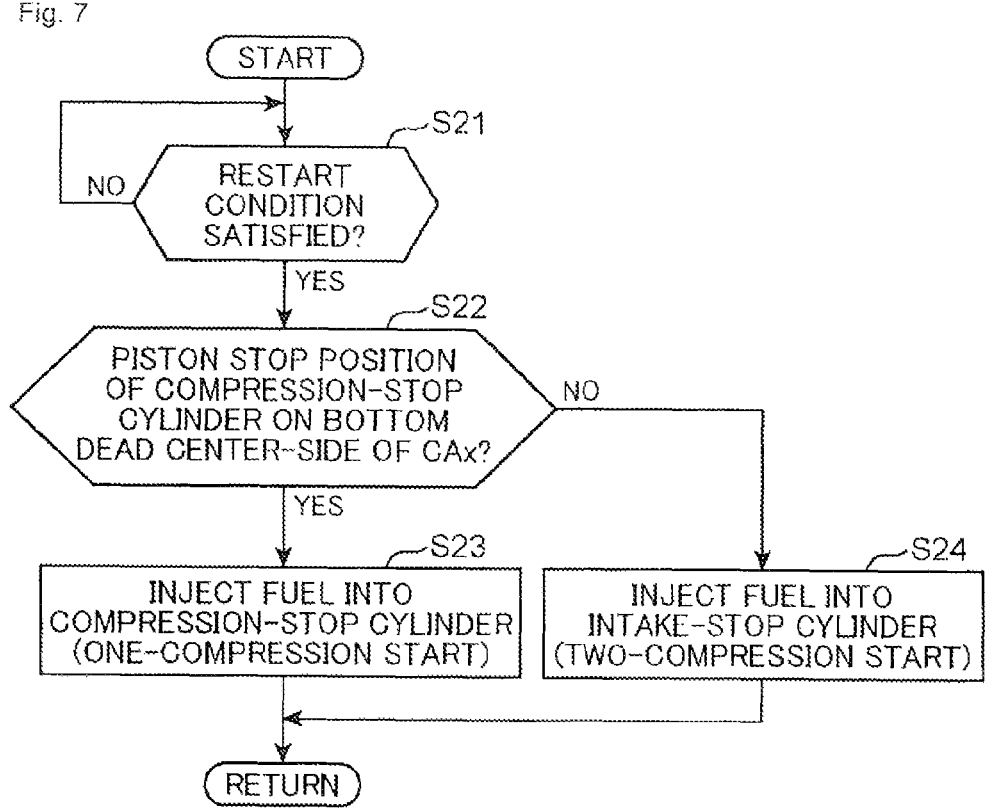
FIG. 7 is a flow chart showing specific contents of a control operation executed upon restart of an engine.

Upon start of processing depicted in the flow chart shown in FIG. 7, the restart controller 52 judges whether or not a restart condition of the engine has been satisfied based on various sensor values (step S21). For example, the restart condition is judged as being satisfied when at least one condition is achieved among conditions which require that the accelerator pedal 36 has been stepped on to move the vehicle (accelerator ON), the battery remaining capacity has dropped, the engine cooling water temperature has dropped below a predetermined value (cold state), a stop duration of the engine (a period of time elapsed after automatic stop) has exceeded a predetermined period of time, and the like.

When a judgment of YES is made in S21 and the restart condition is verified as being satisfied, the restart controller 52 judges whether or not a piston stop position of the Compression-Stop Cylinder 2C is within the target range R shown in FIG. 3 or, in other words, on the bottom dead center-side of the intermediate position CAx (in this case, 90 CA degrees) between top dead center and bottom dead center (step S22).

At this point, in most cases, the piston stop position of the Compression-Stop Cylinder 2C should be within the target range R (on the bottom dead center-side of CAx) due to the effect of automatic stop control (FIG. 6) described above. However, there may conceivably be cases where, for some reason, the piston stop position of the Compression-Stop Cylinder 2C falls outside the target range R (on the top dead center-side of CAx). Therefore, the judgment of step S22 is made as a precautionary measure.

When a judgment of YES is made in step S22 and the piston stop position of the Compression-Stop Cylinder 2C is verified as being in the target range R (on the bottom dead center-side of CAx), the restart controller 52 executes control for restarting the engine by injecting initial fuel into the Compression-Stop Cylinder 2C (one-compression start) (step S23). In other words, by driving the starter motor 34 to apply rotating force to the crankshaft 7 while injecting fuel into the Compression-Stop Cylinder 2C and self-igniting the fuel, the engine is restarted by restarting combustion from the point where the first top dead center is reached by the engine as a whole.

Meanwhile, although unlikely, when a judgment of NO is made in step S22 and the piston stop position of the Compression-Stop Cylinder 2C is verified as being outside the target range R, the restart controller 52 executes control for restarting the engine by injecting initial fuel into the Intake-Stop Cylinder 2D (two-compression start) (step S24). In other words, by driving the starter motor 34 to apply rotating force to the crankshaft 7 while injecting fuel into the Intake-Stop Cylinder 2D and self-igniting the fuel, the engine is restarted by restarting combustion from the point where the second top dead center is reached by the engine as a whole.

(5) Operational Advantages and the Like

As described above, in the present embodiment, during automatic stop control of an engine constituted by a 4-cycle diesel engine, by setting an operating position of the intake throttle 30 to fully closed (0%) (the point t1 in FIG. 2), executing fuel cut for stopping fuel injection from the fuel injection valve 15 (the point t2), and subsequently reducing a target generation current Ge of the alternator 32 in accordance with a rate of decline of an engine rotation speed Ne (the point t3), the engine rotation speed Ne is set within the specific speed range P shown in FIG. 5 when passing the final TDC (the final top dead center of all cylinders immediately before stop). Such a configuration is advantageous in that the piston stop position of the Compression-Stop Cylinder 2C can be kept within the target range R shown in FIG. 3 at higher accuracy and, as a result, fuel injected into the Compression-Stop Cylinder 2C for restart can be reliably self-ignited and the engine can be restarted in a shorter period of time.

In other words, as in the embodiment described above, when the intake throttle 30 is fully closed during automatic stop control of the engine and the fully-closed state is maintained until complete stop of the engine, an average amount of air in the respective cylinders 2A to 2D declines and a piston position upon engine stop becomes more susceptible to a magnitude of an engine rotation speed Net when passing the final TDC (in other words, a difference in momentum of a piston when overcoming the final top dead center). Therefore, in the embodiment described above, after intentionally creating such a state, the target generation current Ge of the alternator 32 is adjusted at a certain point (in FIG. 2, at the point t3) to ensure that the engine rotation speed Net when passing the final TDC falls within the specific speed range P shown in FIG. 5. Accordingly, the piston stop position of the Compression-Stop Cylinder 2C can be kept on the bottom dead center-side of an intermediate position CAx between top dead center and bottom dead center (the target range R) at a high probability.

If the piston 5 of the Compression-Stop Cylinder 2C is within such a range R, when the starter motor 34 is driven to restart the engine, air inside the cylinder 2C is sufficiently compressed and heated by an ascent of the piston 5. Therefore, by injecting initial fuel into the cylinder 2C, the fuel can be reliably self-ignited and burned. Accordingly, combustion can be restarted from a point where the first top dead center is reached by the engine as a whole and the engine can be restarted in a prompt manner.

Furthermore, in the embodiment described above, upon passing top dead center of a cylinder that reaches top dead center n-number of cycles before the final TDC (the point t3 in FIG. 2), a reduction target value of the target generation current Ge of the alternator 32 is calculated based on the engine rotation speed Ne at that time, whereby the target generation current Ge of the alternator 32 is varied according to the target value. Therefore, load applied to the engine can be appropriately adjusted in accordance with a rate of decline of an engine rotation speed Ne before reaching the final TDC and the engine rotation speed Net when passing the final TDC can be reliably kept within the specific speed range P. Accordingly, the piston stop position of the Compression-Stop Cylinder 2C can be kept within the target range R at a higher accuracy and prompt engine restart by injecting initial fuel into the cylinder 2C (one-compression start) can be achieved.

In particular, in the embodiment described above, the target generation current Ge of the alternator 32 is temporarily increased at the point t1 where the automatic stop condition of the engine is satisfied and then reduced by a required amount at the point t3 upon passing the n-th previous top dead center before the final TDC. Therefore, the engine load before reaching the final TDC can be adjusted with superior responsiveness.

In other words, the target generation current Ge of the alternator 32 can be controlled with higher responsiveness when reducing Ge as compared to increasing Ge. Therefore, by increasing Ge in advance at the start of automatic stop control of the engine and then reducing Ge by a required amount at the point t3, the load applied to the engine can be adjusted with superior responsiveness and the piston stop position of the Compression-Stop Cylinder 2C can be more reliably kept within the target range R.

Moreover, in the embodiment described above, since the intake throttle 30 is maintained at a certain valve-opening position (in the example shown in FIG. 2, K=80%) at a point before fully closing the intake throttle 30 (a point prior to t1) regardless of the operating state of the engine, ignition stability can be sufficiently secured until immediately before start of automatic stop control (until t1) and a variation in engine rotation speed Ne upon the start of automatic stop control can be effectively prevented. Accordingly, advantages may be gained in that the engine rotation speed Ne can be lowered according to a scheduled line that is assumed in advance, and that the period of time required until complete stop of the engine (stop time) can be effectively stabilized.

In addition, while the embodiment described above is configured such that by setting the operating position K of the intake throttle 30 to fully closed (0%) upon the point t1 where the automatic stop condition of the engine is satisfied and maintaining the fully-closed state until complete stop of the engine (rotational speed Ne=0 rpm), a situation is created in which the piston stop position of the Compression-Stop Cylinder 2C varies relatively widely according to the engine rotation speed Net when passing the final TDC as depicted by the distribution of the plot X3 shown in FIG. 5. However, as long as a distribution such as that represented by the plot X3 shown in FIG. 5 can be obtained, operating position K=0% need not necessarily be maintained until complete stop of the engine. For example, a distribution similar to the plot X3 (a downward-sloping distribution) may conceivably be obtained by setting the operating position K to 0% until the point of pass of the final TDC (the point t4 in FIG. 2). Therefore, the operating position K of the intake throttle 30 may be maintained at 0% at least until the final TDC.

Furthermore, in the embodiment described above, the operating position K of the intake throttle 30 is set to fully closed (0%) upon the point t1 where the automatic stop condition of the engine is satisfied and, at the point t2 where intake pressure has dropped by a certain degree, fuel cut is executed to stop supply of fuel from the fuel injection valve 15. However, fuel cut may be executed at the same point t1 where the intake throttle 30 is fully closed.

Moreover, in the embodiment described above, the target generation current Ge of the alternator 32 is temporarily increased at the point t1 where the automatic stop condition of the engine is satisfied and then reduced by a required amount at the point t3 upon passing the n-th previous top dead center before the final TDC. Alternatively, the target generation current Ge may be maintained at a relatively low value between the points t1 and t3 and increased at the point t3 (a point where the n-th previous top dead center before the final TDC is passed) depending on the engine rotation speed Ne at that time. In this case, responsiveness to control is not as superior as the embodiment described above in which the target generation current Ge is lowered at the point t3. However, for example, if data describing how much time is required to increase the target generation current Ge by a required amount is available in advance, by performing control in consideration of such a response time, the engine rotation speed Net when passing the final TDC can conceivably be kept within the specific speed range P in a similar appropriate manner to the embodiment described above.

In addition, in the embodiment described above, the generated electricity (target generation current Ge) of the alternator 32 is varied at the point t3 upon passing the n-th previous top dead center before the final TDC to adjust the load applied on the engine. However, if an accessory other than the alternator 32 is available for applying a load to the engine (crankshaft 7), the engine load may be adjusted by controlling an operation of the accessory.

Furthermore, in the embodiment described above, an example has been described in which automatic stop/restart control according to the present invention is applied to a diesel engine (an engine that burns diesel oil by self ignition) as an example of a compression self-ignition engine. However, configurations similar to the present invention are also applicable to compression self-ignition engines other than a diesel engine. For example, while engines in which a fuel including gasoline is compressed at a high compression ratio and self-ignited are recently being studied and developed, the automatic stop/restart control according to the present invention can also be suitably applied to such compression self-ignition gasoline engines.

Finally, an outline will be provided on configurations and operational effects of the present invention that has been disclosed based on the embodiment described above.

The present invention relates to a starter of a compression self-ignition engine which burns fuel injected into a cylinder by self-ignition, wherein the starter automatically stops the engine when a given automatic stop condition that is determined in advance for the engine is satisfied, and restarts the engine when a given restart condition is subsequently satisfied by using a starter motor to apply a rotating force to the engine and executing fuel injection to a Compression-Stop Cylinder that is a cylinder in a compression stroke during engine stop. The starter comprises a controller that controls various devices including an intake throttle that adjusts a flow rate of air passing through an intake passage of the engine, a fuel injection valve that injects fuel into respective cylinders of the engine, and an accessory that applies a load to the engine. The controller executes fuel cut in which fuel injection from the fuel injection valve is stopped, sets an operating position of the intake throttle to fully closed, and maintains the fully-closed state at least until final TDC that is the final top dead center immediately before stop of all cylinders, after the automatic stop condition is satisfied, and further stops a piston of the Compression-Stop Cylinder at a position that is on a bottom dead center-side of an intermediate position between top dead center and the bottom dead center by controlling an operation of the accessory performed after the fuel cut and adjusting an engine load so that an engine rotation speed when passing the final TDC falls within a specific speed range that is determined in advance.

In addition, the present invention relates to a starting method of the compression self-ignition engine. The starting method comprises: a step of, after the automatic stop condition is satisfied, executing fuel cut in which fuel injection from a fuel injection valve provided at each cylinder of the engine is stopped, setting an operating position of an intake throttle that adjusts a flow rate of air flowing through an intake passage of the engine to fully closed, and maintaining the fully-closed state at least until final TDC that is the final top dead center immediately before stop of all cylinders; and stopping a piston of the Compression-Stop Cylinder on a bottom dead center-side of an intermediate position between top dead center and the bottom dead center by controlling an operation after the fuel cut of an accessory that applies a load to the engine and adjusting an engine load so that an engine rotation speed when passing the final TDC falls within a specific speed range that is determined in advance.

As in the inventions described above, when the intake throttle is fully closed during automatic stop control of the engine and the fully-closed state is maintained at least until the final TDC, an average amount of air in the respective cylinders declines and a piston position upon engine stop becomes more susceptible to a magnitude of an engine rotation speed when passing the final TDC (in other words, a difference in momentum of a piston when overcoming the final top dead center). Therefore, in the present invention, after intentionally creating such a state, the engine load is adjusted by controlling an operation of the accessory to ensure that the engine rotation speed when passing the final TDC falls within a specific speed range determined in advance. Accordingly, the piston stop position of the Compression-Stop Cylinder can be kept on the bottom dead center-side of the intermediate position between top dead center and bottom dead center at a high probability.

If the piston position of the Compression-Stop Cylinder is within such a range, when the starter motor is driven to restart the engine, air inside the cylinder is sufficiently compressed and heated by an ascent of the piston. Therefore, by injecting initial fuel into the cylinder, the fuel can be reliably self-ignited and burned. Accordingly, combustion can be restarted from a point where the first top dead center is reached by the engine as a whole and the engine can be restarted in a prompt manner.

Specifically, the specific speed range is favorably set to a range on a low rotation-side of an intermediate value between an upper limit and a lower limit of a speed range which may become an engine rotation speed at the final TDC.

Accordingly, a piston speed when overcoming the final TDC can be relatively reduced and the piston of the Compression-Stop Cylinder can be reliably stopped in the range described above (on the bottom dead center-side of an intermediate position between top dead center and bottom dead center).

In the starter according to the present invention, favorably, the accessory is an alternator that generates electricity by obtaining a drive force from the engine and, after execution of the fuel cut and upon passing of top dead center by a cylinder that reaches top dead center a predetermined number of cycles before the final TDC, the controller calculates a target generation current of the alternator based on an engine rotation speed at that time, and varies generated electricity of the alternator in accordance with the target generation current.

As described above, when varying the generated electricity of the alternator in accordance with a rate of decline of the engine rotation speed before reaching the final TDC, load applied to the engine can be appropriately adjusted based on electricity generation control of the alternator, and the piston stop position of the Compression-Stop Cylinder can be reliably kept within the range described above (on the bottom dead center-side of the intermediate position between top dead center and bottom dead center) with higher accuracy.

In the starter according to the present invention, favorably, the controller maintains the intake throttle at a certain valve-opening position regardless of an operation state of the engine before fully closing the intake throttle in accordance with the automatic stop condition being satisfied.

According to this configuration, ignition stability can be sufficiently secured until immediately before automatic stop control and a variation in engine rotation speed at the start of automatic stop control can be effectively prevented.

The invention claimed is:

1. A starter of a compression self-ignition engine which burns fuel injected into a cylinder by self-ignition, the starter automatically stopping the engine when a given automatic stop condition that is determined in advance for the engine is satisfied, and restarting the engine when a given restart condition is subsequently satisfied by using a starter motor to apply a rotating force to the engine and executing fuel injection to a Compression-Stop Cylinder that is a cylinder in a compression stroke during engine stop, the starter comprising:
   a controller that controls various devices including an intake throttle that adjusts a flow rate of air passing through an intake passage of the engine, a fuel injection valve that injects fuel into respective cylinders of the engine, and an accessory that applies a load to the engine,
   wherein the controller:
   executes fuel cut in which fuel injection from the fuel injection valve is stopped, after the automatic stop condition is satisfied, sets an operating position of the intake throttle to fully closed after the automatic stop condition is satisfied and no later than the execution of the fuel cut, and maintains the fully-closed state at least until final TDC that is the final top dead center immediately before stop of all cylinders; and further
   stops a piston of the Compression-Stop Cylinder at a position that is on a bottom dead center-side of an intermediate position between top dead center and the bottom dead center by controlling an operation of the accessory performed after the fuel cut and adjusting an engine load so that an engine rotation speed when passing the final TDC falls within a specific speed range that is set to a range on a low rotation-side of an intermediate value between an upper limit and a lower limit of a speed range which may become an engine rotation speed at the final TDC.

2. The starter of a compression self-ignition engine according to claim 1, wherein
   the accessory is an alternator that generates electricity by obtaining a drive force from the engine, and
   after execution of the fuel cut and upon passing of top dead center by a cylinder that reaches top dead center a predetermined number of cycles before the final TDC, the controller calculates a target generation current of the alternator based on an engine rotation speed at that time, and varies generated electricity of the alternator in accordance with the target generation current.

3. The starter of a compression self-ignition engine according to claim 2, wherein
   the target generation current of the alternator is temporarily increased when the automatic stop condition is satisfied and then reduced by a required amount at the point upon passing the top dead center before the final TDC by the predetermined number of cycles.

4. The starter of a compression self-ignition engine according to claim 1, wherein
   the controller maintains the intake throttle at a certain valve-opening position regardless of an operation state of the engine before fully closing the intake throttle in accordance with the automatic stop condition being satisfied.

5. A starting method of a compression self-ignition engine which burns fuel injected into a cylinder by self-ignition, the starting method automatically stopping the engine when a given automatic stop condition that is determined in advance for the engine is satisfied, and restarting the engine when a given restart condition is subsequently satisfied by using a starter motor to apply a rotating force to the engine and executing fuel injection to a Compression-Stop Cylinder that is a cylinder in a compression stroke during engine stop, the starting method comprising:
   a step of executing fuel cut in which fuel injection from a fuel injection valve provided at each cylinder of the engine is stopped, after the automatic stop condition is satisfied, setting an operating position of an intake throttle that adjusts a flow rate of air flowing through an intake passage of the engine to fully closed after the automatic stop condition is satisfied and no later than the execution of the fuel cut, and maintaining the fully-closed state at least until final TDC that is the final top dead center immediately before stop of all cylinders; and
   a step of stopping a piston of the Compression-Stop Cylinder on a bottom dead center-side of an intermediate position between top dead center and the bottom dead center by controlling an operation after the fuel cut of an accessory that applies a load to the engine and adjusting an engine load so that an engine rotation speed when passing the final TDC falls within a specific speed range that is set to a range on a low rotation-side of an intermediate value between an upper limit and a lower limit of a speed range which may become an engine rotation speed at the final TDC.

* * * * *